United States Patent
Lopez

(10) Patent No.: US 11,363,767 B2
(45) Date of Patent: Jun. 21, 2022

(54) SYSTEM AND METHOD FOR CONTAINERS WITH INSULATED AND EXPANDED PRODUCTION AREAS

(71) Applicant: Joshua M. Lopez, Austin, TX (US)

(72) Inventor: Joshua M. Lopez, Austin, TX (US)

(*) Notice: Subject to any disclaimer, the term of this patent is extended or adjusted under 35 U.S.C. 154(b) by 131 days.

(21) Appl. No.: 16/702,546

(22) Filed: Dec. 4, 2019

(65) Prior Publication Data

US 2021/0169026 A1 Jun. 10, 2021

(51) Int. Cl.
*A01G 31/02* (2006.01)
*B65D 81/38* (2006.01)

(52) U.S. Cl.
CPC .......... *A01G 31/02* (2013.01); *B65D 81/3813* (2013.01)

(58) Field of Classification Search
CPC ..... A01G 31/02; A01G 9/025; B65D 81/3813
See application file for complete search history.

(56) References Cited

U.S. PATENT DOCUMENTS

| | | | | |
|---|---|---|---|---|
| 8,181,391 B1* | 5/2012 | Giacomantonio | ..... | A01G 9/025 47/62 R |
| 8,516,743 B1* | 8/2013 | Giacomantonio | ..... | A01G 9/025 47/62 A |
| 8,650,806 B1* | 2/2014 | Condie | ................. | E04H 1/1205 52/79.5 |
| 8,720,126 B2* | 5/2014 | Strickland | ............. | E04H 1/1205 52/79.5 |
| 2007/0125024 A1* | 6/2007 | Ponzo | .................... | A01G 9/025 52/364 |
| 2013/0219788 A1* | 8/2013 | VanLente | ................ | A01G 9/022 47/62 A |
| 2016/0324077 A1* | 11/2016 | Frantzen | .................. | A01G 9/14 |
| 2018/0049375 A1* | 2/2018 | Chao | .................... | A01G 9/0297 |
| 2019/0082627 A1* | 3/2019 | Moffitt | .................... | B65D 88/74 |
| 2020/0359585 A1* | 11/2020 | Zarhi | ..................... | A01G 24/44 |

* cited by examiner

*Primary Examiner* — Joshua D Huson
*Assistant Examiner* — Megan J Moroney
(74) *Attorney, Agent, or Firm* — The Villamar Firm PLLC; Carlos R. Villamar

(57) ABSTRACT

A system for containers with insulated and expanded food production areas, the system including a container; one or more panels disposed around the container and configured to provide a boxed enclosure around the container; and soil culture media or water culture media disposed within the boxed enclosure providing an insulated and expanded food production area.

6 Claims, 2 Drawing Sheets

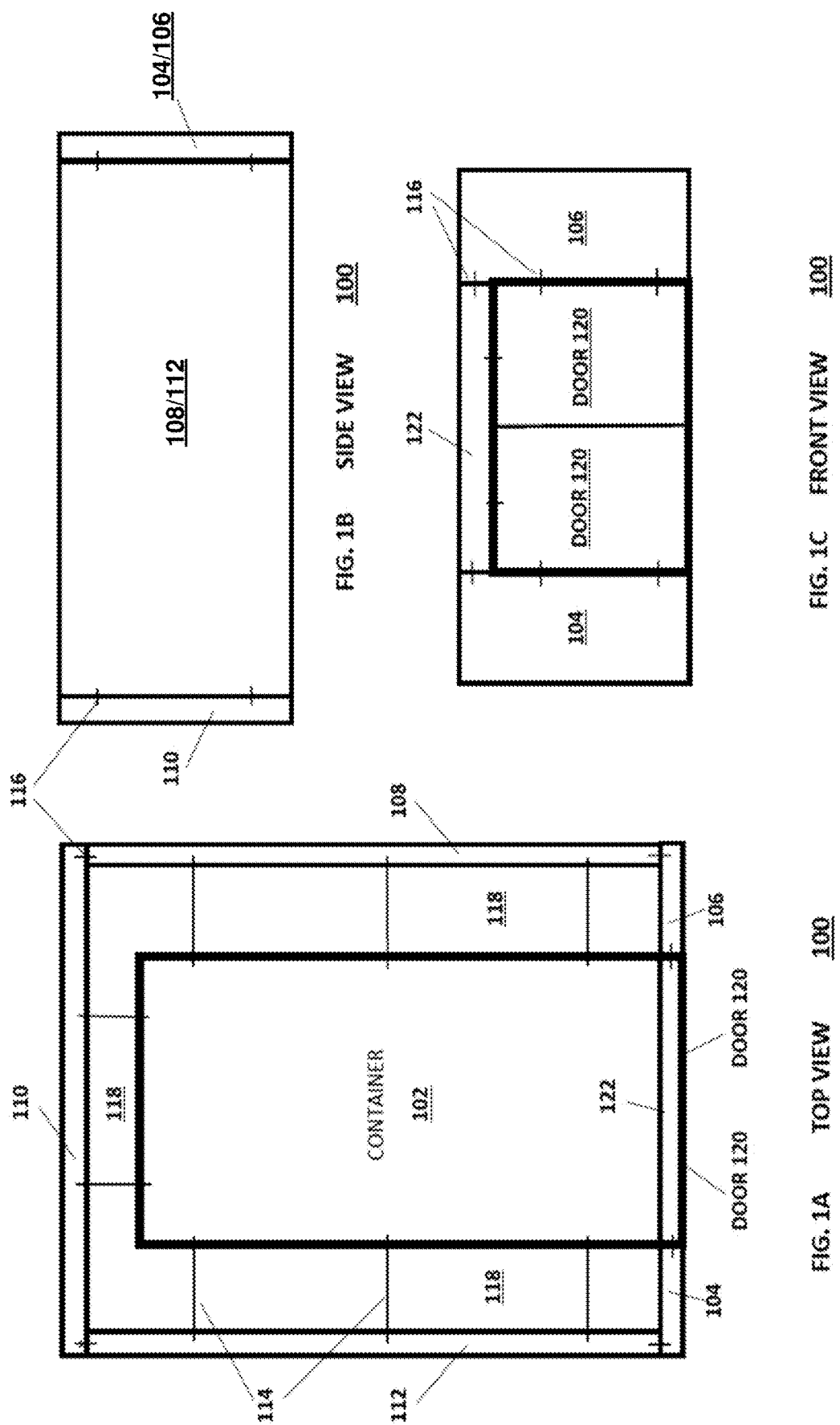

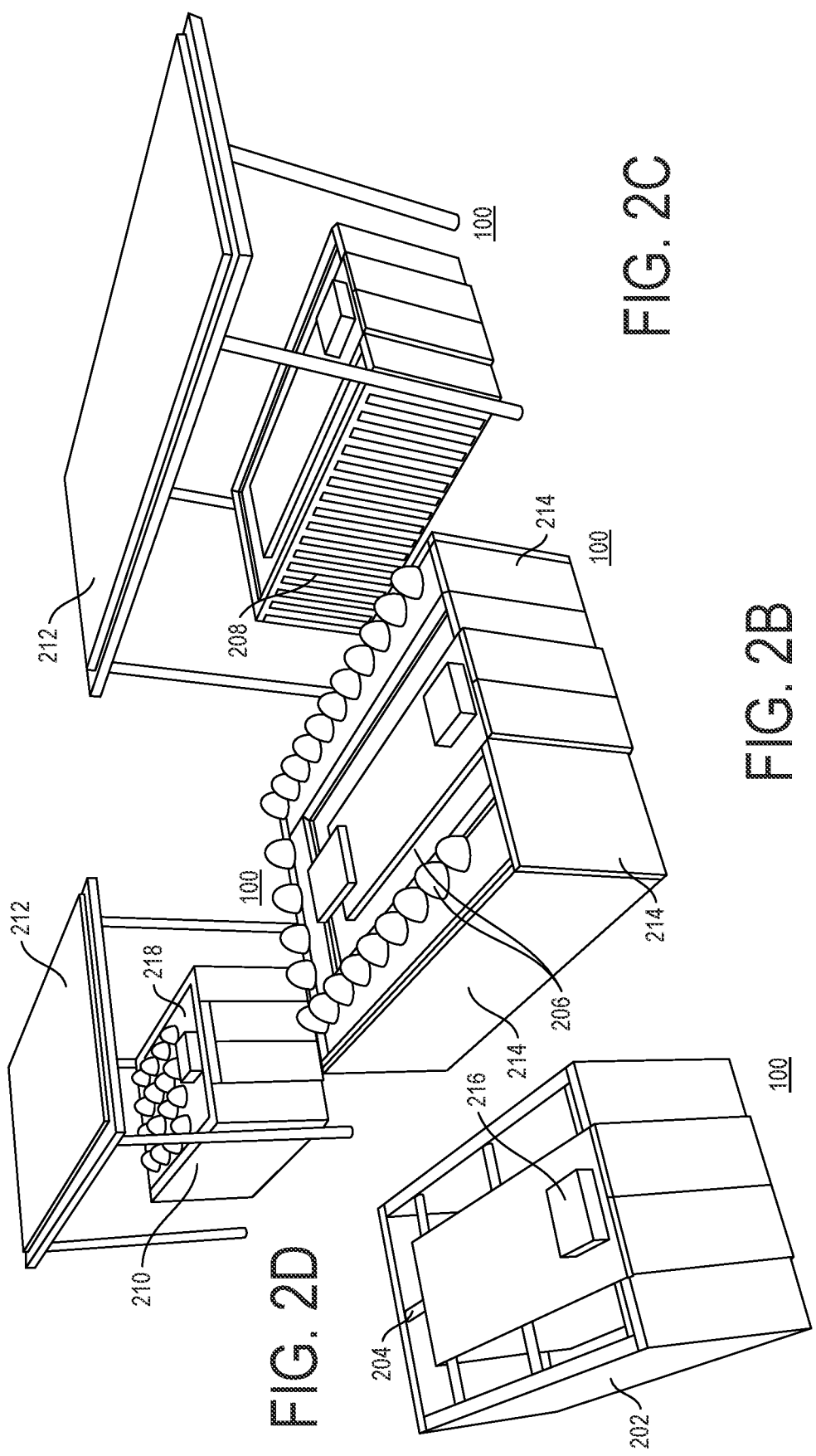

ized and expanded production areas for such containers for housing hydroponic, aeroponic, aquaponic, raised soil culture technologies, living quarters and or storage, and the like.

SYSTEM AND METHOD FOR CONTAINERS WITH INSULATED AND EXPANDED PRODUCTION AREAS

BACKGROUND OF THE INVENTION

Field of the Invention

The present invention generally relates to systems and methods for employing containers, and more particularly to systems and methods for employing containers, including shipping containers, and the like, including insulating and expanding production areas for such containers for housing hydroponic, aeroponic, aquaponic, raised soil culture technologies, living quarters and or storage, and the like.

Discussion of the Background

In recent years, container food production, including hydroponic, aeroponic, aquaponic, and other systems have been developed. However, such systems typically consume a significant amount of energy for climate control, and the like, and are limited in production area, and the like.

SUMMARY OF THE INVENTION

Therefore, there is a need for methods and systems that address the above, and other problems. The above and other problems are addressed by the illustrative embodiments of the present invention, which provide systems and methods for employing containers, including shipping containers, and the like, including insulating and expanding production areas for such containers for housing hydroponic, aeroponic, aquaponic, raised soil culture technologies, living quarters and or storage, and the like.

Accordingly, in illustrative aspects of the present invention there is provided a system for containers with insulated and expanded food production areas, the system including a container; one or more panels disposed around the container and configured to provide a boxed enclosure around the container; and soil culture media or water culture media disposed within the boxed enclosure providing an insulated and expanded food production area.

The soil culture media or water culture media disposed within the boxed enclosure includes at least one of hydroponic, aeroponic, aquaponic, and raised soil culture.

The container can be a shipping container.

The system can further include a solar paneled canopy disposed over the boxed enclosure and the container to shade and power the insulated and expanded food production area.

The system can further include one or more expansion panels disposed around the boxed enclosure and configured to allow for a combination of backfill of soil and water for soil culture and aquaculture.

The system can further include vertical grow channels disposed on one or more exterior sides of the boxed enclosure for vertical food production therein.

The one or more panels disposed around the container are taller than the container and configured to provide a complete backfill with soil or water around and over the entire container.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIGS. 1A, 1B, and 1C are diagrams for describing illustrative containers, including insulating and expanding production areas for such containers for housing hydroponic, aeroponic, aquaponic, raised soil culture technologies, living quarters and or storage, and the like; and FIGS. 2A, 2B, 2C, and 2D are diagrams for describing further illustrative embodiments for employing the containers of FIGS. 1A, 1B, and 1C.

DETAILED DESCRIPTION OF THE PREFERRED EMBODIMENTS

Referring now to the drawings, wherein like reference numerals designate identical or corresponding parts throughout the several views, and more particularly to FIGS. 1A, 1B, and 1C there are shown diagrams for describing illustrative systems and methods 100 for employing containers, including insulating and expanding production areas for such containers for housing hydroponic, aeroponic, aquaponic, raised soil culture technologies, living quarters and or storage, and the like.

In FIGS. 1A, 1B, and 1C, the system 100 can include a container 102, which can include any suitable structure, and the like, that is insulated by front container enclosure panels 104 and 106, side container enclosure panels 108 and 112, back container enclosure panel 110, door container enclosure panel 122. Advantageously, the container can be a converted shipping container, and the like, for housing hydroponic, aeroponic, aquaponic, raised soil culture technologies, living quarters and or storage, and the like. An attachment system, for example, including a rod and bolt system 114, and the like, is employed to connect the panels 104, 106, 108, 110, 112, and 122 to the container 102.

Any suitable fasteners 116 (e.g., L brackets, locking dowels, nut and bolt systems, etc.) can be employed to connect the corners of the panels 104, 106, 108, 110, 112, and 122 to each other. The connection of the panels 104, 106, 108, 110, 112, and 122, advantageously, are configured to form a boxed enclosure around the container 102, including a side for entry, accessibility, and the like, via one or more doors 120, and the like. Open space 118 is thus provide between the panels 104, 106, 108, 110, 112, and 122. Advantageously, the space 118 can be backfilled with water, soil, any other suitable materials, and the like, to insulate and or expand the space 118 that can be used for a food production area, and the like.

The panel 104 connects to the container 102 by the fasteners 116, which connects to the panel 112 and panel 122. The panel 104 connects to the container 102 by the fasteners 116, which connects to the panel 108 and the panel 122. The panel 108 connects to the container 102 by the rod and bolt system 114, and the fasteners 116 to the panel 106 and the panel 110. The panel 110 connects to the container 102 by the rod and bolt system 114 and the fasteners 116 to the panel 108 and the panel 112. The panel 112 connects to the container 102 by the rod and bolt system 114, and the fasteners 116 to the panel 110 and the panel 104. The panel 122 connects to the container 102 by the fasteners 114 and connects the panel 104 and the panel 106. The doors 120 are for entry into the container 102. The insulation area provided by the space 118, advantageously, can be backfilled with water, soil or any suitable material, and the like, to insulate and/or expand the production area provided by the space 118 for soil culture, aquaculture, and the like.

FIGS. 2A, 2B, 2C, and 2D are diagrams for describing further illustrative embodiments for employing the containers of FIGS. 1A, 1B, and 1C. In FIG. 2A, for example, the container 102 includes enclosure panels 202, corresponding to the panels 104, 106, 108, 110 and 112 of FIGS. 1A, 1B, and 1C, provided on the sides as shown, and connected by supports 204, corresponding to the rod and bolt system 114 of FIG. 1A. Any suitable climate control system 216 can be employed for providing heating, ventilation, and air conditioning (HVAC), and the like.

FIG. 2B shows a further configuration with additional panels 214 that provide partitioned and divided enclosures for a mixed backfill of soil on one side, for soil culture, and the like, and water on the other side, for aquaculture, and the like, as shown by 206, and visa versa. Advantageously, in further embodiments, various configurations can be employed to provide options for expanded production areas, and the like.

For example, FIG. 2C shows the system of FIG. 2A, for example, including one or more vertical grow channels 208 provided an exterior side thereof, and which can facilitate vertical food production systems, and the like, on otherwise unused surfaces. Advantageously, a solar paneled canopy 212 can be utilized to shade and power, and the like, the production area provided by the system.

FIG. 2D shows the configuration of FIG. 2A, for example, including panels 210 that are taller than the container itself, and which can be used for a complete backfill 218 with soil, water, other suitable materials, and the like, around and over the entire container. In further embodiments, the panels 210 can be of various suitable heights, for example, to accommodate lower walls, more shallow production areas, and the like.

While the present inventions have been described in connection with a number of illustrative embodiments, and implementations, the present inventions are not so limited, but rather cover various modifications, and equivalent arrangements, which fall within the purview of the appended claims.

What is claimed is:

1. A system for containers with insulated and expanded food production areas, the system comprising:
   a shipping container;
   one or more panels disposed around and attached to the shipping container and configured to provide a boxed enclosure around the shipping container; and
   soil culture media or water culture media disposed within the boxed enclosure providing an insulated and expanded food production area,
   wherein the one or more panels include:
      first, second and third panels attached to the shipping container and disposed so as to avoid obstructing an entrance to the shipping container; and
      fourth and fifth panels attached to the shipping container and disposed next to the entrance to the shipping container and that connect to the first and third panels, respectively.

2. The system of claim 1, wherein the soil culture media or water culture media disposed within the boxed enclosure includes at least one of hydroponic, aeroponic, aquaponic, and raised soil culture.

3. The system of claim 1, further comprising:
   a solar paneled canopy disposed over the boxed enclosure and the container to shade and power the insulated and expanded food production area.

4. The system of claim 1, further comprising:
   one or more expansion panels disposed around the boxed enclosure and configured to allow for a combination of backfill of soil and water for soil culture and aquaculture.

5. The system of claim 1, further comprising:
   vertical grow channels disposed on one or more exterior sides of the boxed enclosure for vertical food production therein.

6. The system of claim 1, wherein the one or more panels disposed around the container are taller than the container and configured to provide a complete backfill with soil or water around and over the entire container.

* * * * *